United States Patent Office 3,340,227
Patented Sept. 5, 1967

3,340,227
STABILIZED POLYAMIDE COMPOSITIONS CONTAINING A COPPER COMPOUND AND A LEAD COMPOUND
Alex Krieger, Emmenbrucke, Switzerland, assignor to Societe de la Viscose Suisse, Emmenbrucke, Switzerland, a corporation of Switzerland
No Drawing. Filed July 1, 1965, Ser. No. 468,979
Claims priority, application Switzerland, July 17, 1964, 9,378/64
7 Claims. (Cl. 260—45.75)

This invention relates to synthetic polyamide compositions which are stabilized against degradation under the influence of heat and light, and to articles made from such compositions, especially textile filaments, fibers, and yarns.

It is known that synthetic polyamides suffer a deterioration of their mechanical properties under the influence of heat and light. When such polyamides are exposed for some time to higher temperatures or to radiation, especially radiation containing ultraviolet rays, they usually become brittle, and their tensile strength decreases considerably. Parallel to this mechanical degradation, the polyamides show a decrease of their viscosity indicating a reduction of their average molecular weight. Since shaped articles, especially textile filaments and yarns, made from polyamides are widely used because of their excellent mechanical properties, the heat- and light-sensitivity of such articles is a great disadvantage, and many efforts have been made to prepare synthetic polyamides which retain their strength after exposure to higher temperatures or to light.

A great variety of substances have been proposed as stabilizers for polyamides, and among them also several metal compounds. Thus, German Patent No. 883,644 describes the use of copper salts; German Patent No. 1,111,376 mentions cerium (III) and titanium (III) salts; United States Patent No. 3,067,168 suggests ionic tin salts; and British Patent No. 899,896 proposes tetravalent organic tin compounds. British Patent No. 862,577 describes polyphosphates of cobalt, nickel, copper and manganese; United States Patent No. 2,887,462 recommends manganese salts with a reducing anion; and British Patent No. 935,796 suggests silicates of aluminum, magnesium, and lead.

It has also often been tried to increase the stabilizing effect by using a combination of different substances and also to obtain a protection which is equally effective against heat and light. Thus, French Patent No. 1,099,407 recommends a combination of copper and manganese; and Belgian Patent No. 625,367 uses as stabilizers cuprous chloride or stannous chloride in combination with alkyl- or arylphosphinates.

When using as stabilizers copper or copper compounds, the polyamides often show a yellow to red discoloration, which is especially unpleasant, when colorless or white textile fibers are to be produced. Furthermore, in the manufacture of copper-stabilized polyamides, it often happens that copper is deposited in the polycondensation installations, and, when melt-spinning polyamide fibers, such deposits may block the spinning filters and interrupt the spinning process. A consequence of such precipitation of copper is, of course, a reduction of the copper content of the polyamide whereby the stabilization effect is diminished.

These difficulties in using copper as stabilizer increase, when it is necessary to prepare polyamide compositions which contain stabilizers in concentrated form. Such concentrates are required in continuous polycondensation processes, where it is usual to mix a major proportion of a basic unstabilized polyamide with a small quantity of the required type of concentrate containing the desired additives, such as stabilizers, pigments, dyes, optical brighteners, etc. The concentrate and the basic polyamide are usually mixed in proportions between 1 to 10 and 1 to 20, and it follows that the concentrate must contain 10 to 20 times the quantity of additives that are desired in the final product.

It is an object of this invention to provide polyamide compositions which are stabilized against degradation under the influence of heat and light.

Another object is to provide stabilized polyamide compositions which are not discolored.

A further object is to provide polyamide compositions containing stabilizers in a concentrated form which, when mixed with a major proportion of unstabilized polyamides yield undiscolored heat- and light-stabilized polyamide compositions.

These and other objects are accomplished by the present invention which provides polyamide compositions stabilized against degradation by heat and light by the incorporation with the polyamide during manufacture of copper or a copper compound and a lead compound.

The copper may be derived from any source. Thus, both elemental copper and any suitable inorganic or organic copper compound can be used, for example, oxides, chlorides, bromides, iodides, borates, phosphates, acetates, oxalates, butyrates, lactates, stearates, benzoates, salicylates, phthalates, or naphthenates of copper. The copper may be in the cuprous or cupric state.

The lead compound should be selected from the colorless lead (II) salts of inorganic or organic acids, for example, the chloride, bromide, sulphate, phosphate, borate, carbonate, formate, acetate, oxalate, citrate, laurate, stearate. In particular, lead (II) acetate is most frequently employed.

To make polymers for direct use, the stabilizers are preferably used in quantities corresponding to between 20 and 100 parts by weight of copper and between 20 and 100 parts by weight of lead, per million parts of polyamide. For concentrates however which are to be mixed with a basic unstabilized polyamide, the quantities of stabilizers used may correspond to between 100 and 1,000 parts by weight of copper and between 100 and 1,000 parts by weight of lead, per million parts of polyamide, according to the intended mixing proportions. If desired, other known stabilizers, for example phenolic antioxidants or phosphorus oxyacids, can be added.

The stabilizing effect of the combination according to this invention surpasses considerably the effect which can be obtained by use of copper salts alone or of lead salts alone, and especially surprising is the almost equally high protection against degradation by heat and light. To give an example, the tensile strength of yarns made from poly-caprolactam and containing as stabilizers copper acetate and lead (II) acetate, which were heated in air during 8 hours to 177° C. or irradiated during 220 hours in a fadeometer, respectively, differed only to 2–8 percent from the tensile strength of untreated yarns. Yarns made for comparison and containing as stabilizer copper acetate only or lead (II) acetate only had lost by heating 12 percent and 30 percent, and by irradiation 25 percent and 35 percent, respectively, of their original strength. Another comparison yarn containing as stabilizer manganous oxalate, which is preferably used for protection against light, had lost 15 percent of its strength in the irradiation test.

The present invention is generally applicable to polyamides prepared from polyamide precursors, such as polymerizable mono-amino-carboxylic acids or their amide-forming derivatives, or from suitable diamines and suitable dicarboxylic acids or amide-forming derivatives of these compounds. Preparation and use of such polyamides are described in U.S. Patents Nos. 2,071,250; 2,071,253; and 2,130,948. The polyamides have recurring carbonamide groups in the main polymer chain separated by hydrocarbon groups containing at least two carbon atoms.

There is a special advantage when using the invention for polyamides made from ω-amino carboxylic acids, such as polycaprolactam, poly(ω-amino undecanoic acid), poly(ω-amino enanthic acid), poly(ω-amino-caprylic acid), poly(ω-amino lauric acid), and poly(ω-amino tridecyclic acid).

While polyamides stabilized according to the invention and made by polycondensation of diamines and dicarboxylic acids, e.g., polyhexamethylene adipamide, polyhexamethylene suberamide, polyhexamethylene sebacamide, polyoctamethylene adipamide, polydodecamethylene lauramide, or poly-m-xylylene sebacamide, also possess the high protection against heat and light mentioned above, they usually show the same reddish discoloration as polyamides stabilized by the use of copper alone. However, poly(ω-amino carboxylic acids) stabilized according to the invention, are colorless.

Stabilized poly(ω-amino carboxylic acid) compositions containing, as mentioned above, 10 to 20 times the quantity of stabilizers that are desired in the final product, are usually somewhat yellowish, but the color disappears when the concentrates are mixed with the required quantity of unstabilized basic polymer, and fibers and other articles formed from the mixture are colorless.

The stabilizers are incorporated into the polyamide during their manufacture, preferably before or during polycondensation. The conditions for the polycondensation are conventional. When making polyhexamethylene adipamide, the required copper and lead compounds are mixed with a 50 percent aqueous solution of hexamethylene diamine adipate. The solution is warmed until it has a concentration of 75-80 percent, and then heated in an autoclave under nitrogen, until a pressure of 18 atmospheres is reached. The pressure is maintained until water is evaporated, and then gradually released within 90 minutes. Finally, polycondensation is continued under nitrogen of atmospheric pressure during 30 minutes at about 277° C.

To make stabilized polyycaprolactam, caprolactam is melted at about 90° C., and about 1 percent by weight of water is added under stirring containing the copper and lead compounds. The mixture is heated under nitrogen during 2 hours at 250° C. in an autoclave. Then the pressure is released within 10 minutes, and polycondensation continued under nitrogen during 4 hours at the same temperature. The polymer is extruded as usual, washed during 24 hours with water of 70° C. to extract the monomers, and finally dried during 3 days at 70° C. under reduced pressure.

When making polymers for direct use, 0.1 percent by weight of benzoic acid are also added as chain terminator before polycondensation, while such addition is not necessary when making polymer concentrates.

The invention is illustrated by the following examples in which the incorporation of the stabilizers and the polycondensation schedule was as described above. The color of spun yarns is given according to visual observation. The "reduced viscosity" $(\eta)_{0.2}$ is calculated according to the formula:

$$(\eta)_{0.2} = \frac{\ln \eta_{rel}}{0.2}$$

wherein the relative viscosity $\eta_{rel}$ is determined in a solution containing 0.2 g. of polyamide fiber in 100 ml. of 94% sulfuric acid at a temperature of 20° C. The tensile strength, expressed in grams per denier, is measured as usual, and the irradiation test is carried out with an Atlas Fadeometer, Type FDA-R, made by Atlas Electric Devices Co., Chicago, Ill., U.S.A., according to a method described in the "Technical Manual of the American Association of Textile Chemists and Colorists," published by Howes Publishing Co., New York, 1957.

*Example I*

Six polyamide compositions are prepared as described above, five compositions (1) to (5) being made from 5 kg. caprolactam each, and one composition (6) being made from 5 kg. hexamethylene diamine adipate, the terms "parts Cu," "parts Mn," or "parts Pb" meaning parts by weight of copper, manganese, or lead, respectively, per million parts of polyamide. Composition (1) contains no stabilizer, composition (2) contains 0.78 g. of copper acetate (=50 parts Cu), composition (3) contains 0.10 g. of manganous oxalate (=6 parts Mn), composition (4) contains 0.50 g. of lead (II) acetate (=55 parts Pb), composition (5) contains 0.78 g. of copper acetate (=50 parts Cu) and 0.50 g. of lead (II) acetate (=55 parts Pb), and composition (6) contains 0.78 g. of copper acetate (=50 parts Cu) and 0.50 g. of lead (II) acetate (=55 parts Pb).

From each composition yarns are melt spun and cold-drawn, each yarn having a total of 70 denier (=8 tex.) and comprising 23 filaments. The yarns from compositions (1), (3), (4), and (5) are colorless, and the yarns from compositions (2) and (6) are reddish. Each yarn is examined as to: (a) reduced viscosity and tensile strength, when untreated, (b) reduced viscosity and tensile strength, after having been heated in air during 8 hours at 177° C., and (c) tensile strength, after having been irradiated during 220 hours in a fadeometer. Ten tests each are made of each yarn according to (a), (b), and (c), and Table I shows the averages of these tests indicating (a) the reduced viscosity and tensile strength of the untreated yarns, (b) the changes of viscosity and strength of the heated yarns expressed in percent of the viscosity and strength of the untreated yarns, and (c) the change of strength of the irradiated yarns expressed in percent of the strength of the untreated yarns.

TABLE I

| | Stabilizer used | (a) Untreated yarns | | (b) Yarns heated 8 hours to 177° C. | | (c) Yarns irradiated 220 hrs. in fadeometer |
| | | Reduced viscosity, $\frac{\ln \eta_{rel}}{0.2}$ | Tensile strength, grams per denier | Change of— | | |
| | | | | Reduced viscosity,[1] percent | Tensile strength,[1] percent | Tensile strength,[1] percent |
|---|---|---|---|---|---|---|
| (1) | | 1.14 | 5.2 | −57 | −53 | −47 |
| (2) | Copper acetate | 1.12 | 5.1 | −11 | −12 | −25 |
| (3) | Manganous oxalate | 1.19 | 4.2 | −61 | −58 | −15 |
| (4) | Lead (II) acetate | 1.24 | 5.3 | −28 | −30 | −35 |
| (5) | Copper acetate + lead (II) acetate | 1.17 | 5.6 | +3 | +2 | −8 |
| (6) | ------do------ | 1.06 | 4.3 | −2 | −2 | −8 |

[1] Against untreated yarns.

Example II

Two "concentrate" polyamide compositions are prepared as described above, each made from 5 kg. of caprolactam, but with different stabilizers, the terms "parts Cu" are "parts Pb" meaning parts by weight of copper or lead, respectively, per million parts of polyamide. Composition (7) contains 11.8 g. of copper acetate (=750 parts Cu) and composition (8) contains 11.8 g. of copper acetate (=750 parts Cu) and 7.6 g. of lead (II) acetate (=825 parts Pb). Composition (7) is red, and composition (8) is dark yellow.

5 kg. each of compositions (7) and (8) are mixed with 75 kg. each of a basic polycaprolactam containing no stabilizers except 0.1 percent by weight of benzoic acid as chain terminator. From each of the two mixtures yarns are melt-spun and cold-drawn, each yarn having a total of 70 denier (=8 tex.) and comprising 23 filaments. The yarn from the mixture with composition (7) is pink, and the yarn from the mixture with composition (8) is colorless. Each yarn is examined as to: (a) reduced viscosity and tensile strength, when untreated, (b) reduced viscosity and tensile strength, after having been heated in air during 8 hours at 177° C., and (c) tensile strength, after having been irradiated during 220 hours in a fadeometer. Ten tests each are made of each yarn according to (a), (b), and (c), and Table II shows the averages of these tests indicating (a) the reduced viscosity and tensile strength of the untreated yarns, (b) the changes of viscosity and strength of the heated yarns expressed in percent of the viscosity and strength of the untreated yarns, and (c) the change of strength of the irradiated yarns expressed in percent of the strength of the untreated yarns.

lead (II) chloride, lead (II) bromide, lead (II) sulfate, lead (II) phosphate, lead (II) borate, lead (II) carbonate, lead (II) formate, lead (II) acetate, lead (II) oxalate, lead (II) citrate, lead (II) laurate, and lead (II) stearate, per million parts by weight of the polyamide.

2. A composition in accordance with claim 1 in which the polyamide is a poly($\omega$-amino carboxylic acid).
3. A composition in accordance with claim 1 in which the polyamide is polycaprolactam.
4. A composition in accordance with claim 1 in which the polyamide is poly($\omega$-amino undecanoic acid).
5. A composition in accordance with claim 1 in which the lead salt is lead (II) acetate.
6. A polyamide composition which is stabilized against degradation by heat and light comprising a polyamide having recurring carbonamide groups in the main polymer chain separated by hydrocarbon groups containing at least two carbon atoms, and from 20 to 100 parts by weight of copper derived from the group consisting of elemental copper, cuprous oxide, cupric oxide, cuprous chloride, cupric chloride, cuprous bromide, cupric bromide, cuprous iodide, cupric iodide, cuprous borate, cupric borate, cuprous phosphate, cupric phosphate, cuprous acetate, cupric acetate, cuprous oxalate, cupric oxalate, cuprous butyrate, cupric butyrate, cuprous lactate, cupric lactate, cuprous stearate, cupric stearate, cuprous benzoate, cupric benzoate, cuprous salicylate, cupric salicylate, cuprous phthalate, cupric phthalate, cuprous naphthenate, and cupric naphthenate, and between 20 and 100 parts by weight of lead derived from the group consisting of lead (II) chloride, lead (II) bromide, lead (II) sulfate, lead (II) phosphate, lead (II) borate, lead (II) carbonate, lead (II) formate, lead (II) acetate, lead (II) oxalate,

TABLE II

| Stabilizer used | | Mixing proportion, concentrate/ basic polymer | (a) Untreated yarns | | (b) Yarns heated 8 hours to 177° C. | | (c) Yarns irradiated 220 hrs. in fadeometer |
|---|---|---|---|---|---|---|---|
| | | | Reduced viscosity, $\frac{\ln \eta_{rel}}{0.2}$ | Tensile strength, grams per denier | Change of— | | |
| | | | | | Reduced viscosity,[1] percent | Tensile strength,[1] percent | Tensile strength,[1] percent |
| (7) | Copper acetate | 1:15 | 1.22 | 4.8 | −22 | −26 | −31 |
| (8) | Copper acetate + lead (II) acetate | 1:15 | 1.08 | 4.8 | +1 | +2 | −8 |

[1] Against untreated yarns.

The present invention may be embodied in other specific forms without departing from the spirit or essential attributes thereof and, accordingly, reference should be made to the appended claims, rather than to the foregoing specification as indicating the scope of the invention.

I claim:

1. A polyamide composition which is stabilized against degradation by heat and light comprising a polyamide having recurring carbonamide groups in the main polymer chain separated by hydrocarbon groups containing at least two carbon atoms, and from 20 to 1000 parts by weight of copper derived from the group consisting of elemental copper, cuprous oxide, cupric oxide, cuprous chloride, cupric chloride, cuprous bromide, cupric bromide, cuprous iodide, cupric iodide, cuprous borate, cupric borate, cuprous phosphate, cupric phosphate, cuprous acetate, cupric acetate, cuprous oxalate, cupric oxalate, cuprous butyrate, cupric butyrate, cuprous lactate, cupric lactate, cuprous stearate, cupric stearate, cuprous benzoate, cupric benzoate, cuprous salicylate, cupric salicylate, cuprous phthalate, cupric phthalate, cuprous naphthenate, and cupric naphthenate, and between 20 and 1000 parts by weight of lead derived from the group consisting of lead (II) citrate, lead (II) laurate, and lead (II) stearate, per million parts by weight of the polyamide.

7. A polyamide composition which is stabilized against degradation by heat and light comprising a polyamide having recurring carbonamide groups in the main polymer chain separated by hydrocarbon groups containing at least two carbon atoms, and from 100 to 1000 parts by weight of copper derived from the group consisting of elemental copper, cuprous oxide, cupric oxide, cuprous chloride, cupric chloride, cuprous bromide, cupric bromide, cuprous iodide, cupric iodide, cuprous borate, cupric borate, cuprous phosphate, cupric phosphate, cuprous acetate, cupric acetate, cuprous oxalate, cupric oxalate, cuprous butyrate, cupric butyrate, cuprous lactate, cupric lactate, cuprous stearate, cupric stearate, cuprous benzoate, cupric benzoate, cuprous salicylate, cupric salicylate, cuprous phthalate, cupric phthalate, cuprous naphthenate, and cupric naphthenate, and between 100 and 1000 parts by weight of lead derived from the group consisting of lead (II) chloride, lead (II) bromide, lead (II) sulfate, lead (II) phosphate, lead (II) borate, lead (II) carbonate, lead (II) formate, lead (II) acetate, lead (II) oxalate, lead (II) citrate, lead (II) laurate, and lead (II) stearate, per million parts by weight of the polyamide.

(References on following page)

References Cited

UNITED STATES PATENTS

| | | | |
|---|---|---|---|
| 2,846,332 | 8/1958 | Nesty | 260—45.75 |
| 2,919,258 | 12/1959 | Pietrusza et al. | 260—45.75 |
| 3,066,034 | 11/1962 | Temin | 260—45.75 |

FOREIGN PATENTS

| | | |
|---|---|---|
| 906,893 | 6/1945 | France. |
| 5,350 | 9/1954 | Germany. |

DONALD E. CZAJA, *Primary Examiner.*
LEON J. BERCOVITZ, *Examiner.*
V. P. HOKE, G. W. RAUCHFUSS, JR.,
*Assistant Examiners.*